United States Patent [19]
Suzuki

[11] Patent Number: 4,520,301
[45] Date of Patent: May 28, 1985

[54] CONTROLLING APPARATUS FOR POSITIONING

[75] Inventor: Hayao Suzuki, Tokyo, Japan

[73] Assignee: Kabushiki Kaisha Daini Seikosha, Tokyo, Japan

[21] Appl. No.: 505,057

[22] Filed: Jun. 16, 1983

[51] Int. Cl.³ .............................................. G05B 11/36
[52] U.S. Cl. ................................... 318/609; 318/603; 364/161
[58] Field of Search ..................... 318/609, 610, 603; 364/160, 161, 162, 163

[56] References Cited

U.S. PATENT DOCUMENTS

| | | | |
|---|---|---|---|
| 3,748,565 | 7/1973 | Wilson et al. | 318/609 |
| 4,408,148 | 10/1983 | Herzog | 318/610 |
| 4,415,966 | 11/1983 | Herzog | 318/610 X |
| 4,422,025 | 12/1983 | Steller | 318/609 |

Primary Examiner—B. Dobeck
Attorney, Agent, or Firm—Robert E. Burns; Emmanuel J. Lobato; Bruce L. Adams

[57] ABSTRACT

In a positioning control apparatus for use in a positioning device which operates in response to input pulses in accordance with the speed and the number of the pulses, a PI amplifier is connected in a control loop. The integral factor I of the PI amplifier is temporarily removed therefrom when a speed feedback signal more than a predetermined level is produced. As a result, hunting operation can be eliminated without the use of expensive semiconductor circuitry with excellent offset characteristics.

7 Claims, 6 Drawing Figures

– 1 –

CONTROLLING APPARATUS FOR POSITIONING

BACKGROUND OF THE INVENTION

The present invention relates to a positioning control apparatus for use in a driving device of a machining apparatus using a servomotor or the like, and more particularly to a positioning control apparatus comprising a motor, a digital type position detector, a digital type speed detector and a feedback circuit, in which the operation is carried out in accordance with the speed of an input pulse and the amount of the input pulse.

In the prior art, positioning control systems such as shown in FIG. 1 or FIG. 2 have been employed for controlling positioning devices of the type described above. The difference between the control systems of FIGS. 1 and 2 is in the feedback circuit. That is, although the signal from a tacho-generator 3 as a speed detecting device is directly used as a speed feedback signal in the control system of FIG. 2, a feedback pulse from an encoder 2, which is a digital type position detector, is employed as a speed feedback signal D after being converted into a voltage signal by a F/V converter 8. As will be understood from the above description, these control systems are essentially of the same type.

Therefore, the operation of the conventional control system will be described in the case of the system of FIG. 1. When an input pulse C is applied to the system, a comparing means in the form of a counter 4 which is used as a detecting means for detecting the positional difference between a target position of the object and an actual position thereof counts the input pulses C to increase the content of the counter 4. As a result, the output level of a D/A converter 5 is also increased and a control signal in the form of a driving instruction signal A is applied to a motor 1 through a subtracter 6 and a driving amplifier 7. The operation of the positioning device or the operation of the motor 1 at this time is detected by means of the encoder 2 and the resulting feedback pulses B from the encoder 2 are applied to the counter 4 to decrease the content of the counter 4 in accordance with the feedback pulses B. The feedback pulses B are also applied to the F/V converter 8 to convert the feedback pulses B into a speed feedback signal D. The speed feedback signal D is applied to the subtracter 6 in which the subtraction operation between the signals D and A is carried out to form a feedback loop.

In such a prior art positioning control system, as shown in FIG. 3, the relationship between the content of the counter 4 (abcissa) and the signal A (ordinate) which is provided to the driving amplifier 7 becomes linear. In general, since a frictional load necessarily exists in a positioning driving mechanism, there is a neutral zone in which the object is not able to move unless a torque more than the frictional load is provided to the motor. This zone is indicated by hatching in FIG. 3.

Therefore, in the case that the object is moved one increment when one pulse is applied to the motor, there is the disadvantage that the object starts to move only when the content of the counter 4 exceeds a predetermined value. In addition, since it is impossible to carry out the moving operation in response to each one pulse, the accuracy of the positioning is low. Furthermore, since the magnitude of the frictional load in the positioning driving mechanism depends upon the location of the object, an irregularity of operation will occur when the pulse speed is not so high. These problems may be solved if a large torque motor is employed and the torque of the motor exceeds over the value of the neutral zone even when the content of the counter 4 is increased by a value corresponding to one input pulse. However, the use of such an extremely large torque motor is disadvantageous because the controlling system becomes large. In addition, due to the frequent starting, stopping and reversing operations of the positioning mechanism, much power consumption is required due to the large inertial force of the large torque motor. Therefore, it becomes difficult to minimize the apparatus and to save energy.

SUMMARY OF THE INVENTION

It is, therefore, an object of the present invention to provide an improved control apparatus for a positioning device in which the drawbacks described above can be eliminated.

According to the present invention, a control apparatus for a positioning device of the type having a motor, a digital type position detector, a speed detector and a feedback control device and operates in response to an input pulse in accordance with the speed and the number of the pulses, comprises a first means for comparing the pulse number of the input pulses with that of the feedback pulses from said digital type position detector, a second means for converting the output signal from the first means into an analog form, a third means for subtracting the signal from the speed detector from the output signal from the second means, a fourth means for detecting the absolute value of the signal of the speed detector to obtain a corresponding binary code thereof, a PI amplifier for amplifying the output signal from the third means and a switching means for changing the PI amplifier so as to act as a P amplifier. The input terminal of the switching means is connected to said fourth means and the output terminal of the switching means is connected to the PI amplifier. The switching means is rendered operative when the detected result of said fourth means shows that the speed is large.

Further objects and advantages of the invention will become apparent from the following detailed description to be read in conjunction with the accompanying drawings in which:

DETAILED DESCRIPTION OF INVENTION

Figure 1:
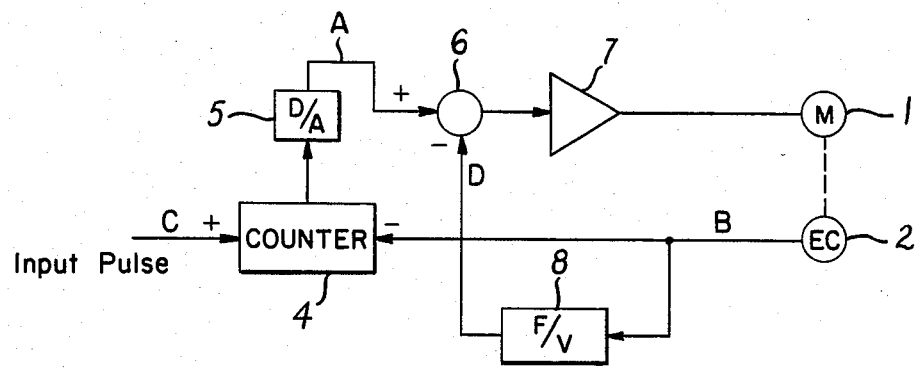
FIGS. 1 and 2 are block diagrams illustrating two embodiments of the conventional positioning control apparatus.
Figure 2:
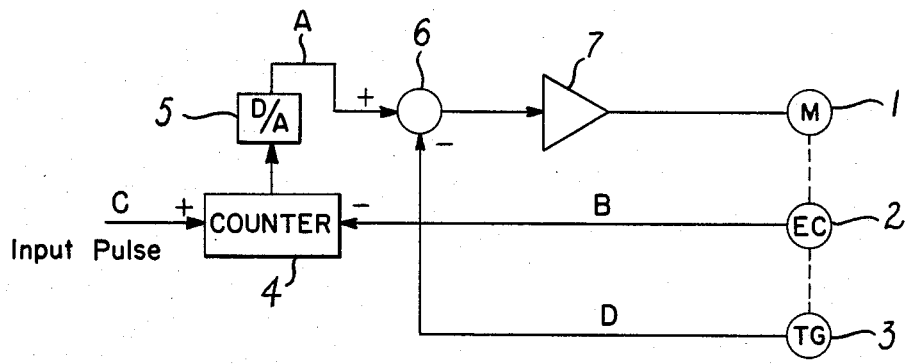
Figure 3:
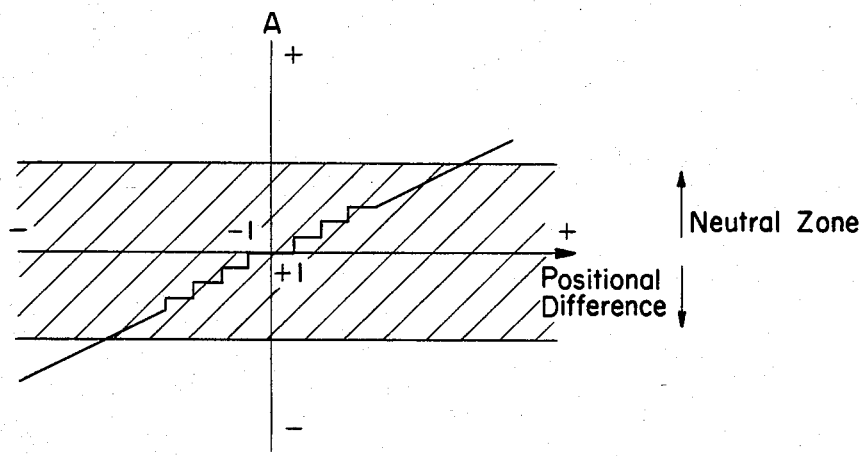
FIG. 3 is an explanatory view illustrating the relationship between the positional difference and the driving signal for the apparatus in FIGS. 1 and 2.
Figure 4:
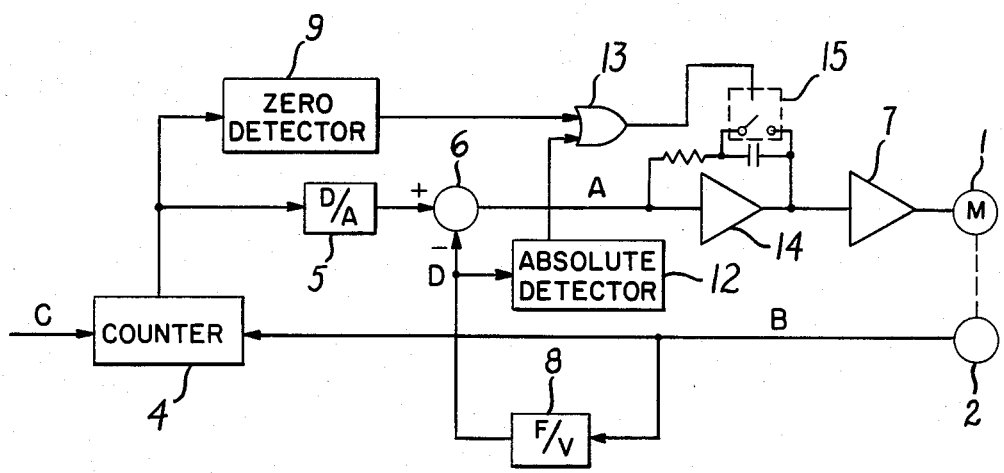
FIGS. 4 and 5 are block diagrams of respective embodiments of the present invention.
Figure 5:
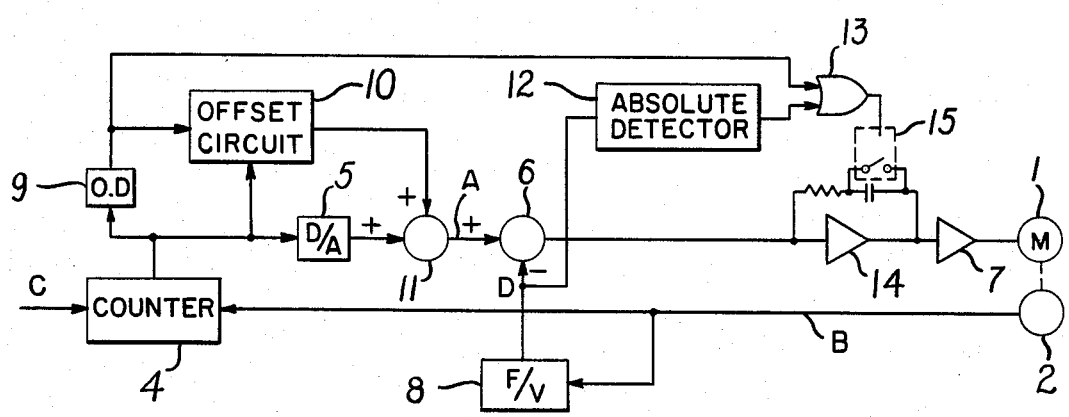

FIGS. 4 and 5 show embodiments of the present invention, respectively. In FIGS. 4 and 5, elements designated by numeral references 1 to 8 are the same elements shown in FIGS. 1 and 2. In order that a bipolar operation can be performed by the use of the D/A converter 5, the "zero state" of the counter 4 is selected to be $(100 \ldots 0)_2$ or $(011 \ldots 1)_2$ which are the middle counting numbers of the counter 4. When the power switch (not shown) is turned on or the system is reset, one of these middle counting numbers is set in the counter 4. A zero detector 9 is a gate circuit for detecting whether or not the counting number of the counter 4 is the set middle number. When the magnitude of the driving instruction signal cannot overcome the frictional load so that the system operates in the neutral zone, it is possible to escape from the neutral zone if the driving instruction signal A is amplified by a PI amplifier 14 having an integral amplifying function. This is the reason why it is possible to increase the driving force to an unlimited extent with the passage of time in a PI amplifier. Consequently, a torque greater than the frictional load can surely be produced and the system will escape from the neutral zone. Therefore, it is effective to operate the PI amplifier when it is feared that the system will fall into the neutral zone due to low speed operation. When more reliability is required, the PI amplifier should be operated in accordance with an algorithm in which the magnitude of the signal from the F/V converter 8 which acts as a speed detector is extremely small in spite of the non-zero state of the counter 4. In other words, the proportional factor I should be omitted from the PI amplifier 14 when the counting state of the counter 4 becomes "zero state" or the feedback signal has a level more that a predetermined value.

In order to realize such a system, an absolute detector 12 for detecting the speed feedback signal D, a killer switch 15 for omitting the I factor from the PI amplifier and an OR circuit 13 for actuating the killer switch 15 when the counting result of the counter 4 is in a "zero state" or the output of the speed absolute detector 12 indicates a "large absolute" value are connected as shown.

The operation of the PI amplifier 14 will be described in more detail. Since the D.C. gain of the PI amplifier 14 is infinity, even when the counting result of the counter 4 is "zero state" and the output level of the D/A converter is about OV, the output level becomes large due to the offset current and voltage in the semiconductor circuit. As a result, a hunting operation over a relatively large period of time will occur. To avoid this, the precise offset adjustment should be made and a circuit having an extremely stable offset characteristic should be used. However, use of such a circuit will increase the manufacturing cost. Therefore, to avoid the cost increase, it is necessary to render the I factor inoperative when the content of the counter 4 is "zero".

FIG. 5 shows another embodiment of the present invention, which further comprises an offset circuit 10 and an adder 11 as compared with the system shown in FIG. 4. In the control system of FIG. 4, although it is possible to escape from the neutral zone by waiting the passage of time, the response characteristic during one pulse feeding depends upon the value of the frictional load. When a precise speed controlling operation is required, the bit number of the counter 4 should be enlarged, so that the electrical resolution per one pulse in the D/A converter becomes extremely small. In this case, it sometimes happens that the change of the output voltage per one pulse is smaller than the voltage change due to drift of the semiconductors used in the D/A converter or the PI amplifier 14. In such a case, since the D.C. gain of the PI amplifier 14 is infinity, for example, there will occur the phenomenon that the reversed positioning operation is carried out since the polarity of the output signal of the PI amplifier is negative even if positive one pulse is applied to the counter 4 so as to increase the counting result thereof.

Figure 6:
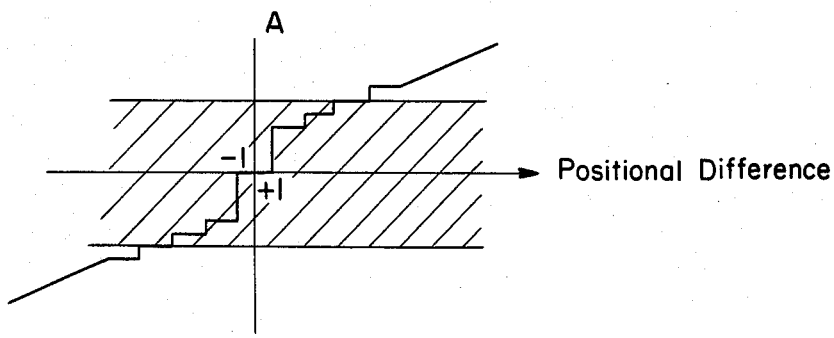
FIG. 6 is an explanatory view illustrating the relationship between the positional difference and the driving signal for the embodiment of FIG. 5.

This drawback described above can be solved by the use of the circuit 10 which computes the polarity of the output signal to be produced by the D/A counter on the basis of the output signal of the zero detector 9 and the polarity of the counter 4. The output signal of the offset circuit 10 is applied through the adder 11 to the input terminal of the PI amplifier. As a result, the relationship between the positional difference indicated by the counter 4 and the driving instruction signal A is as shown by FIG. 6. That is, the scattering of the response for one pulse feeding can be remarkably reduced, and the optimum response characteristic for the frictional load of the positioning driving mechanism can be realized by the adjustment of the amount of offset. Furthermore, when a counter having large bit capacity is used, the problem of the reverse positioning described above can be easily solved.

According to the present invention, since the drawbacks of the conventional system are improved by the increase of the D.C. gain when the operation is carried out in the neutral zone, the effect of the present invention is remarkably large as compared with that of the conventional device. Therefore, it is possible to provide a positioning control apparatus having economical and technical merits.

I claim:

1. A positioning control apparatus for controlling a positioning device of the type having a motor, a digital type position detector, a speed detector and a feedback control device and which operates in response to input pulses in accordance with the speed and the number of the pulses; said apparatus comprising:
   a first means for comparing the pulse number of the input pulses with that of the feedback pulses from said digital type position detector;
   a second means for converting the output signal from said first means into an analog form;
   a third means for subtracting the signal from said speed detector from the output signal from said second means;
   a fourth means for detecting the absolute value of the signal of said speed detector to obtain a corresponding binary code thereof;
   a PI amplifier for amplifying the output signal from said third means; and
   a switching means for changing said PI amplifier so as to act as a P amplifier, the switching means having an input terminal connected to said fourth means and an output terminal connected to said PI amplifier, said switching means being rendered operative to effect the changing of the PI amplifier when the detected result of said fourth means shows that the speed is larger than a given value.

2. An apparatus as claimed in claim 1; wherein said apparatus further comprises a zero detector responsive to the output signal of said first means for detecting whether or not the content of said first means is the zero state, an offset circuit responsive to the output signals of said first means and said zero detector for causing said second means to produce a signal with the same polarity as that of the signal to be produced from said second means in accordance with the polarity of said first means when the output of said zero detector indicates a non-zero state, and an adder for adding the output of said offset circuit to the output of said second means and applying the added output to said third means.

3. An apparatus as claimed in claim 1; wherein said apparatus further comprises a zero detector responsive to the output signal of said first means for detecting whether or not the content of said first means is the zero state, an OR circuit responsive to the outputs of said zero detector and said fourth means for providing an output to said switching means to render said switching means operative when the zero state of said first means is detected or when the absolute value of the speed is larger than a given value.

4. In an apparatus for controlling a positioning device of the type having a motor driven in opposite directions by input pulses of opposite polarity for positioning an object, a digital type position detector for detecting the motor position and producing corresponding feedback pulses indicative of the motor position, and a speed detector for detecting the motor speed and producing an output speed signal: comparing means for comparing the number of input pulses with the number of feedback pulses and producing a digital comparison signal; converting means for converting the digital comparison signal into a corresponding analog signal; subtracting means for subtracting the speed signal from the analog signal and producing a control signal; detecting means for detecting the absolute value of the speed signal and producing a corresponding absolute value signal; PI amplifier means for amplifying the control signal and producing an amplified control signal to be applied to the motor, the PI amplifier means being normally operable in a PI amplifying mode and being switchable to operate in a P amplifying mode; and switching means connected to receive the absolute value signal and operative when the absolute value signal is greater than a given value to switch the PI amplifier means to operate in the P amplifying mode.

5. An apparatus according to claim 4; including circuit means for controlling the polarity of the analog signal applied to the subtracting means.

6. An apparatus according to claim 5; wherein the circuit means comprises zero detecting means responsive to the digital comparison signal for detecting whether or not the digital comparison signal is in a zero state, and means responsive to the detection made by the zero detecting means and the digital comparison signal for controlling the polarity of the analog signal so that the analog signal polarity is the same as the polarity of the input pulses being compared by the comparing means whenever the digital comparison signal is in a non-zero state.

7. An apparatus according to claim 6; wherein the last-mentioned means includes an offset circuit connected to receive the output from the zero detecting means and the digital comparison signal, and an adder circuit connected to receive the output of the offset circuit and the digital comparison signal.

* * * * *